US007047496B2

(12) United States Patent
Nelles et al.

(10) Patent No.: US 7,047,496 B2
(45) Date of Patent: May 16, 2006

(54) METHOD FOR VISUALIZATION OF OPTICAL NETWORK TOPOLOGY

(75) Inventors: David Edward Nelles, Ottawa (CA); Daniel Adamski, Ottawa (CA); Paul David Obeda, Ottawa (CA); Victoria Donnelly, Ottawa (CA)

(73) Assignee: Tropic Networks Inc., Kanata (CA)

( * ) Notice: Subject to any disclaimer, the term of this patent is extended or adjusted under 35 U.S.C. 154(b) by 711 days.

(21) Appl. No.: 10/101,155

(22) Filed: Mar. 20, 2002

(65) Prior Publication Data

US 2003/0180042 A1    Sep. 25, 2003

(51) Int. Cl.
*G09G 5/00* (2006.01)

(52) U.S. Cl. .................... 715/736; 715/734; 703/14

(58) Field of Classification Search ........ 715/734–736; 398/27; 359/110, 124; 714/704–708; 703/14–18, 703/21; 379/221.15; 370/242, 254, 255
See application file for complete search history.

(56) References Cited

U.S. PATENT DOCUMENTS

| | | | | |
|---|---|---|---|---|
| 5,841,981 | A * | 11/1998 | Kondo | 709/223 |
| 5,926,463 | A * | 7/1999 | Ahearn et al. | 370/254 |
| 6,690,884 | B1 * | 2/2004 | Kelty et al. | 398/27 |
| 6,714,739 | B1 * | 3/2004 | Kandpal et al. | 398/31 |
| 6,728,484 | B1 * | 4/2004 | Ghani | 398/42 |
| 6,782,209 | B1 * | 8/2004 | Copeland et al. | 359/157 |
| 6,850,253 | B1 * | 2/2005 | Bazerman et al. | 715/734 |
| 2002/0024535 | A1 * | 2/2002 | Ueno et al. | 345/736 |
| 2002/0181037 | A1 * | 12/2002 | Lauder et al. | 359/110 |
| 2003/0058496 | A1 * | 3/2003 | Obeda et al. | 359/124 |
| 2003/0099010 | A1 * | 5/2003 | Liu et al. | 359/110 |
| 2003/0112958 | A1 * | 6/2003 | Beaudoin et al. | 379/221.15 |
| 2003/0130821 | A1 * | 7/2003 | Anslow et al. | 702/186 |
| 2004/0107277 | A1 * | 6/2004 | Levesque et al. | 709/223 |
| 2004/0223461 | A1 * | 11/2004 | Scrandis et al. | 370/242 |

OTHER PUBLICATIONS

Jamison, J., et al, "vBNS: not your father's Internet", at http://www.vbns.net/index.html?g=2&t=97&i=264 &URL=papers/notyour/notyourf.html.
"Map of an Aggregated View of the MBGP Topology", at http://www.caida.org/tools/measurement/Mantra/topology/topo-java/global-view.html.
Ndn-map from NORDUnet (Nordic Internet Highway to Research and Education Networks in Nordic Countries) at http://www.nordu!net/stat-q/load-map/ndn-map,,traffic,busy.
Worldcom promotional brochure, "High Performance Nationwide IP Network" at http://www.vbns.net.

* cited by examiner

*Primary Examiner*—Ba Huynh
(74) *Attorney, Agent, or Firm*—Victoria Donnelly

(57) ABSTRACT

A method for the simultaneous graphical display of paths of optical wavelength channels in a telecommunications network together with one or more channel attributes is provided. The graphical display of the network also shows the direction of data flow transported by the channels. An audible or visual alarm for an error condition for a channel attribute on a link in the network can be produced if requires. The operator can also obtain detailed information on a channel by positioning the mouse over a channel.

19 Claims, 9 Drawing Sheets

| Attribute | % Range | Graphical display | Meaning |
|---|---|---|---|
| Power | 0-24 % | | -24.1 dBm to Missing |
| | 25-49% | | -16.1 dBm to -24 dBm |
| | 50-74% | | -8.1 dBm to -16 dBm |
| | 75-100% | | 0 dBm to -8 dBm |
| Bit Error Rate | 0-24 % | | $10^{-4}$ to ERROR |
| | 25-49% | | $10^{-9}$ to $10^{-5}$ |
| | 50-74% | | $10^{-14}$ to $10^{-10}$ |
| | 75-100% | | $10^{-19}$ to $10^{-15}$ |
| Dispersion Factor | 0-24 % | | Same as % Range |
| | 25-49% | | Same as % Range |
| | 50-74% | | Same as % Range |
| | 75-100% | | Same as % Range |
| Optical Return Factor | 0-24 % | | Same as % Range |
| | 25-49% | | Same as % Range |
| | 50-74% | | Same as % Range |
| | 75-100% | | Same as % Range |

METHOD FOR VISUALIZATION OF OPTICAL NETWORK TOPOLOGY

FIELD OF THE INVENTION

The invention relates to optical networks, and in particular to visualization of the topology of an optical network.

BACKGROUND OF THE INVENTION

As communications networks have grown in complexity, the task of effective network management has become increasingly important.

An important aspect of network management is the topology of the network, which traditionally includes network connectivity. Equally important for effective network management and planning is information concerning configuration and performance characteristics, such as bandwidth and load.

The visual representation of networks in traditional network management systems is limited to the topology and connectivity of the network, see, e.g. a publication by John Jamison et al "vBNS: not your father's Internet", 2001 [on the world wide web at vbns.net/index.html]; "Map of an Aggregated View of the MBGP Topology", 2002 [on the world wide web at caida.org/tools/measurement/]; Ndn-map from NORDUnet, 2002 (Nordic Internet Highway to Research and Education Networks in Nordic Countries) [on the world wide web at nordu.net/]; and promotional brochure "High Performance Nationwide IP Network", 2001, of WorldCom [on the world wide web at vbns.net]. Unfortunately, none of the current technologies provides adequate visualization for monitoring both network topology and network performance.

Accordingly, there is a need for the development of an improved method for visualization of an optical network topology, which would be particularly applicable to wavelength channel visualization.

SUMMARY OF THE INVENTION

It is therefore an object of the invention to provide a method for visualization of the topology of an optical network, which would avoid the afore-mentioned drawbacks.

According to one aspect of the invention there is provided a computer-implemented method for visualization of the topology of optical network, comprising the steps of:

determining a channel identifier for a channel travelling in the network;

determining a path of the channel in the network by using the channel identifier;

graphically displaying the path of the channel in the network including displaying a direction of propagation of the channel in the network.

Advantageously, the method further comprises the step of determining an attribute of the channel along the path of the channel in the network, the step being performed before the step of displaying, wherein the step of graphically displaying the path of the channel in the network comprises graphically displaying the path of the channel in the network together with the evolution of the channel attribute along the path.

Beneficially, the step of determining the channel identifier comprises determining the wavelength of the channel, and the step of determining the attribute of the channel comprises determining one or more of the following attributes of the channel: power, bit error rate, dispersion factor or optical return factor.

Conveniently, the step of graphically displaying the path of the channel comprises graphically displaying the path of more than one channel simultaneously, and for each channel, displaying more than one channel attribute simultaneously.

The step of graphically displaying the path of the channel, comprising displaying of the channel attributes, may be performed by using graphical display characteristics such as color, shading, pattern and/or geometrical shape.

Conveniently, the step of displaying the path of the channel may comprise representing the path by a geometric shape, the geometrical shape being substantially a line, the thickness of the line representing the value of the channel attribute to be displayed. The step of displaying the path of the channel in the network may further comprise displaying one more channel attribute by using a filling of the thickness of the line, the filling being one of the pattern and shading, variations of the filling representing the evolution of the value of the channel attribute. If additional channel attributes have to be displayed, it may be done in the following manner: the geometrical shape representing the path of the channel in the network may be split into segments, each segment corresponding to the path of the channel between two nodes, and each segment may further be split into sections whose number is equal to the number of the attributes to be displayed, wherein each section uses a distinct graphical display characteristic and represents the value of the corresponding attribute between the two nodes.

Conveniently, the step of graphically displaying the path of the channel in the network comprises displaying the path of the channel on a computer screen. The step of determining the attribute of the channel along the path of the channel in the network may comprise customized selection of the attribute from a menu. Similarly, the step of simultaneously displaying the path of more than one channel in the network may comprise the step of customized selection of the channels from a menu.

Advantageously, the step of graphically displaying the path of the channel in the network comprises refreshing the graphical displaying of the channel path in response to a signal, the refreshed graphical display incorporating changes which occurred in the network since previous graphical displaying. The step of refreshing the graphical display comprises refreshing the graphical display in response to an external signal. Conveniently, the step of refreshing may comprise refreshing of the graphical display at discrete time intervals.

If required, the step of graphically displaying the path of the channel in the network may further comprise displaying the value of the channel attributes in a text information box. The step of displaying the value of channel attributes in the text information box may comprise displaying the text information box in response to the movement of a screen pointing device over the path of the channel in the network, the text information box showing the value of the channel attributes at the position along the path of the channel in the network, indicated by the pointing device.

Beneficially, the step of displaying the path of the channel in the network further comprises the step of generating one of the audible and visual alarm if an error condition along the path of the channel occurs.

According to another aspect of the invention there is provided a computer program product for visualizing topology of an optical network, comprising:

computer usable medium having computer readable program code means embodied in said medium for causing a computer to visualize the topology of the network, said computer program product having:

computer readable program code means for causing said computer to determine a channel identifier for a channel travelling in the network;

computer readable program code means for causing said computer to determine a path of the channel in the network by using the channel identifier; and computer readable program code means for causing said computer to graphically display the path of the channel in the network including displaying a direction of propagation of the channel in the network.

According to yet another aspect of the invention there is provided a computer program for visualization of topology of an optical network, comprising:

computer readable program code means for causing a computer to determine a channel identifier for a channel travelling in the network;

computer readable program code means for causing said computer to determine a path of the channel in the network by using the channel identifier; and computer readable program code means for causing said computer to graphically display the path of the channel in the network including displaying a direction of propagation of the channel in the network.

The described method of visualization of the network topology has the following advantages. It provides more effective monitoring of the network performance and ensures much easier and more reliable control of operation of the network.

BRIEF DESCRIPTION OF THE DRAWINGS

The invention will be further understood from the following description, with reference to the accompanying drawings in which:

FIG. 1b is a diagram illustrating a user interface dialog box used to select channels and channel attributes for the graphical display of FIG. 1a;

FIG. 1c is a diagram illustrating a user interface dialog box used to select display preferences for the graphical display of FIG 1a;

FIG. 2b is a diagram illustrating a user interface dialog box used to select channels and channel attributes for the graphical display of FIG. 2a;

FIG. 3b is a diagram illustrating a user interface dialog box used to select channels and channel attributes for the graphical display of FIG. 2a;

FIG. 4b is a diagram illustrating a user interface dialog box used to select channels and channel attributes for the graphical display of FIG. 4a;

FIG. 5 is a table illustrating graphical representation of channel attributes used in the graphical display of FIG. 4a;

FIG. 6b is a diagram illustrating a user interface dialog box used to select channels and channel attributes for the graphical display of FIG. 6a;

FIG. 7b is a diagram illustrating a user interface dialog box used to select channels and channel attributes for the graphical display of FIG. 7a.

DETAILED DESCRIPTION OF THE PREFERRED EMBODIMENTS

Figure 1A:
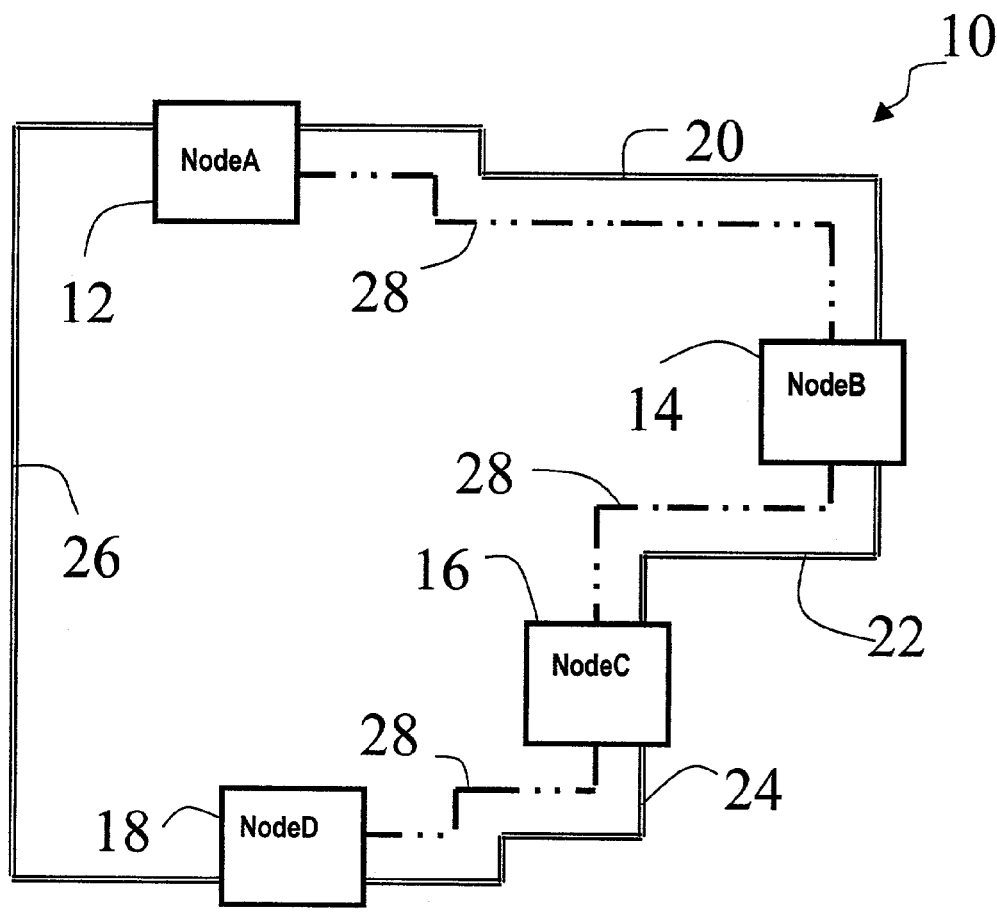
FIG. 1a is a diagram illustrating the graphical display of an optical network topology according to a first embodiment of the invention.
Figure 1B:
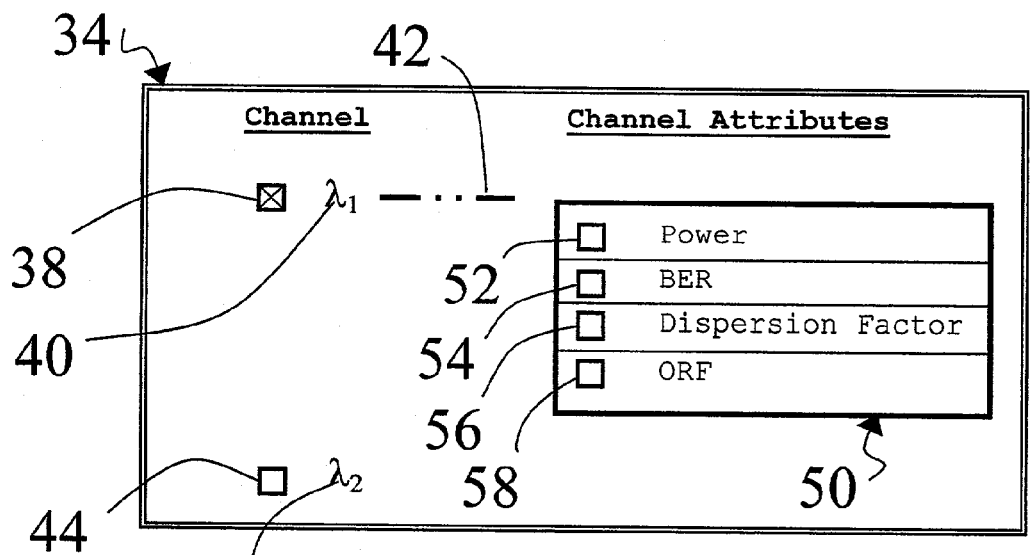

FIG. 1a illustrates the visualization of an optical network by means of a graphical display 10, according to a first embodiment of the invention. The network comprises four network elements called nodeA, nodeB, nodeC and nodeD, and labeled 12, 14, 16 and 18 respectively. An optical fiber link 20 connects NodeA to nodeB, another link 22 connects nodeB to nodeC, yet another link 24 connects nodeC to nodeD, and link 26 connects nodeD to nodeA. An optical wavelength channel 28, hereinafter referred to as a channel, is shown being carried by the optical fiber 20 between the nodeA 12 and nodeB 14. The same channel 28 is carried by optical fiber 22 between nodeB 14 and nodeC 16, and again by optical fiber 24 between nodeC 16 and nodeD 18. Thus, the channel 28 traverses a path between nodeA 12 and nodeD 18, comprising three segments (fiber links 20, 22 and 24 respectively), each segment being highlighted with an identifying pattern, a long dash and two dots in FIG. 1a. FIG. 1b illustrates an exemplary user interface dialog box 34 used by the operator to select the highlighting of the path of channel 28 in the graphical display 10. In the dialog box 34, the operator has chosen highlighting for channel 28 in the graphical display 10 by selecting checkbox 38, with the channel identifier $\lambda_1$ labelled 40 and the line pattern 42. A pop-up dialog box 50 for the attributes of the $\lambda_1$ channel is shown in FIG. 1b, with four unselected checkboxes 52, 54, 56, 58 for the Power, Bit Error Rate (BER), Dispersion Factor, and the Optical Return Factor (ORF), respectively, indicating that attributes for the channel $\lambda_1$ are not to be indicated in the graphical display 10. Another checkbox 44 is shown for a second channel $\lambda_2$, but is not selected, indicating the operator has chosen neither the channel nor attributes for the second channel $\lambda_2$ to be highlighted in the graphical display 10.

Figure 1C:
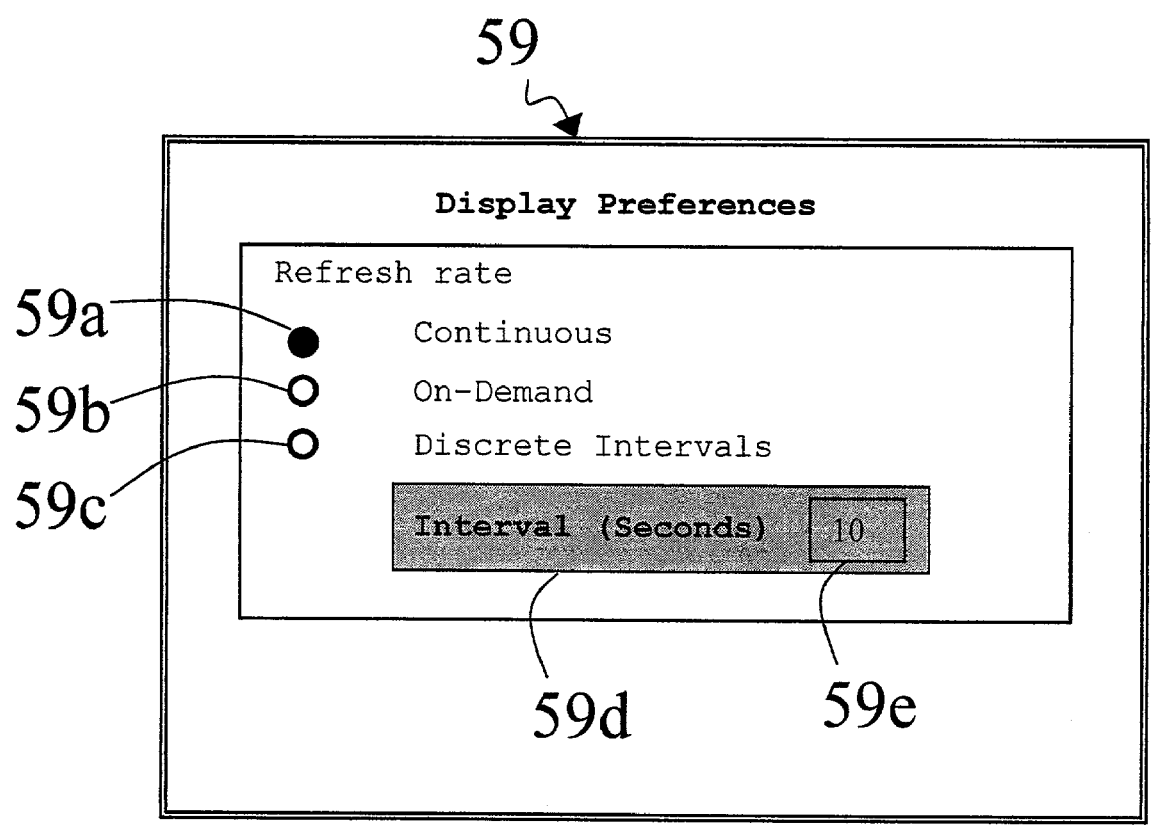

FIG. 1c illustrates an exemplary user interface dialog box 59 used by the operator to select display preferences for the graphical display 10. The operator selects the radio button 59a to refresh the graphical display continuously, so changes to the network are updated on the graphical display 10 in real-time. Alternatively, the operator may select the radio button 59b to refresh the graphical display 10 only when the operator requests, or yet alternatively the operator may select the radio button 59c to refresh the graphical display 10 at discrete intervals. In this case, the dialog box 59d is activated, allowing the user to change the number of seconds 59e between refreshing the graphical display 10. If the radio button 59a or 59b is selected, the dialog box 59d is greyed out and is inactive.

Thus, the automatic visualization of the topology of the optical network is provided, including a path of the wavelength channel in the network.

Figure 2A:
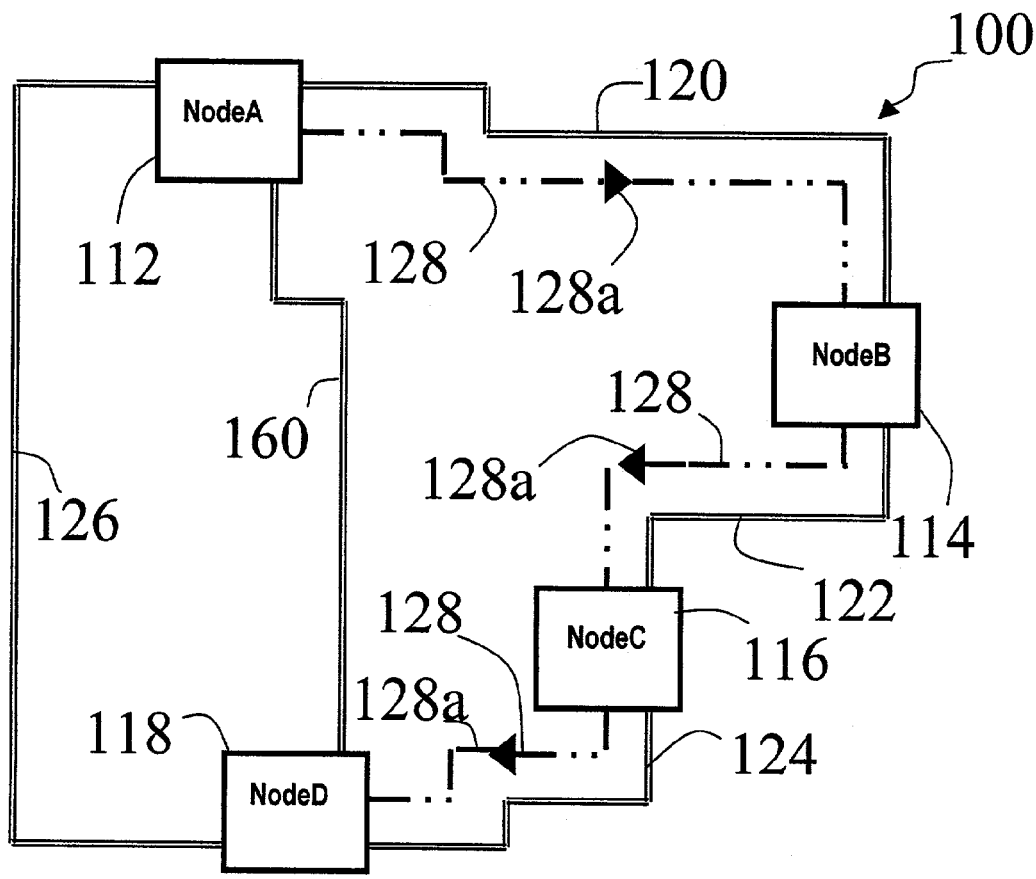
FIG. 2a is a diagram illustrating the graphical display of an optical network topology according to a second embodiment of the invention.
Figure 2B:
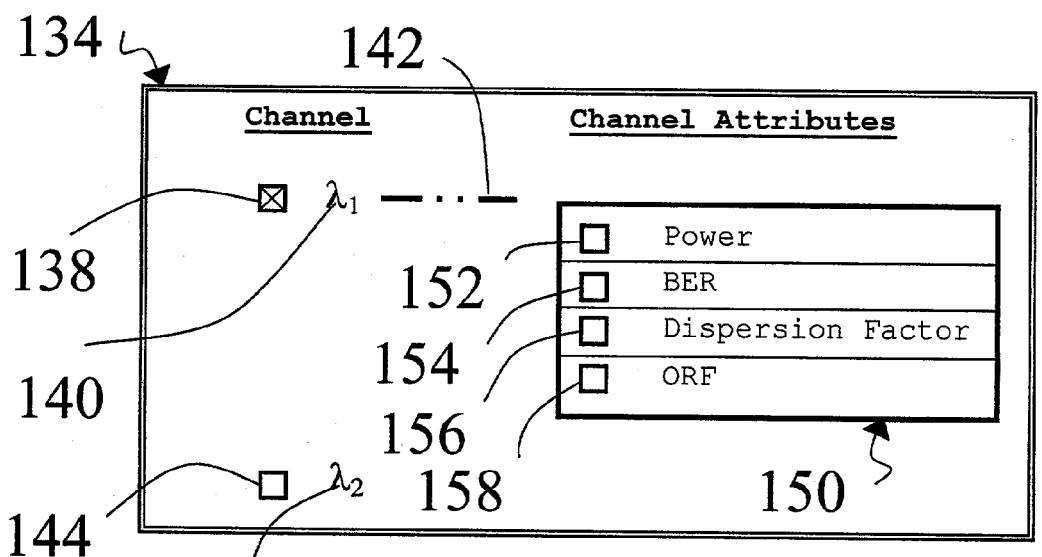

FIGS. 2a and 2b illustrate the visualization of an optical network topology by a graphical display according to the second embodiment of the invention. The graphical display 100 is similar to that of the first embodiment, except the direction of the data carried by the optical channel 128 is indicated by an arrow 128a. Similar elements in FIGS. 1a and 1b and FIGS. 2a and 2b are designated by the same reference numerals incremented by 100 respectively. FIG. 2b illustrates an exemplary user interface dialog box 134 used by the operator to select the highlighting of channels in the graphical display 100. In the dialog box 134, the operator has chosen highlighting for channels 128 with the channel identifiers $\lambda_1$ in the graphical display 100 by selecting checkbox 138. The line pattern 142 is shown to identify the channel $\lambda_1$ in the graphical display 100. Consequently, the direction of data carried by a channel is shown, providing a means for more effective management of optical wavelength channels in a network.

Figure 3A:
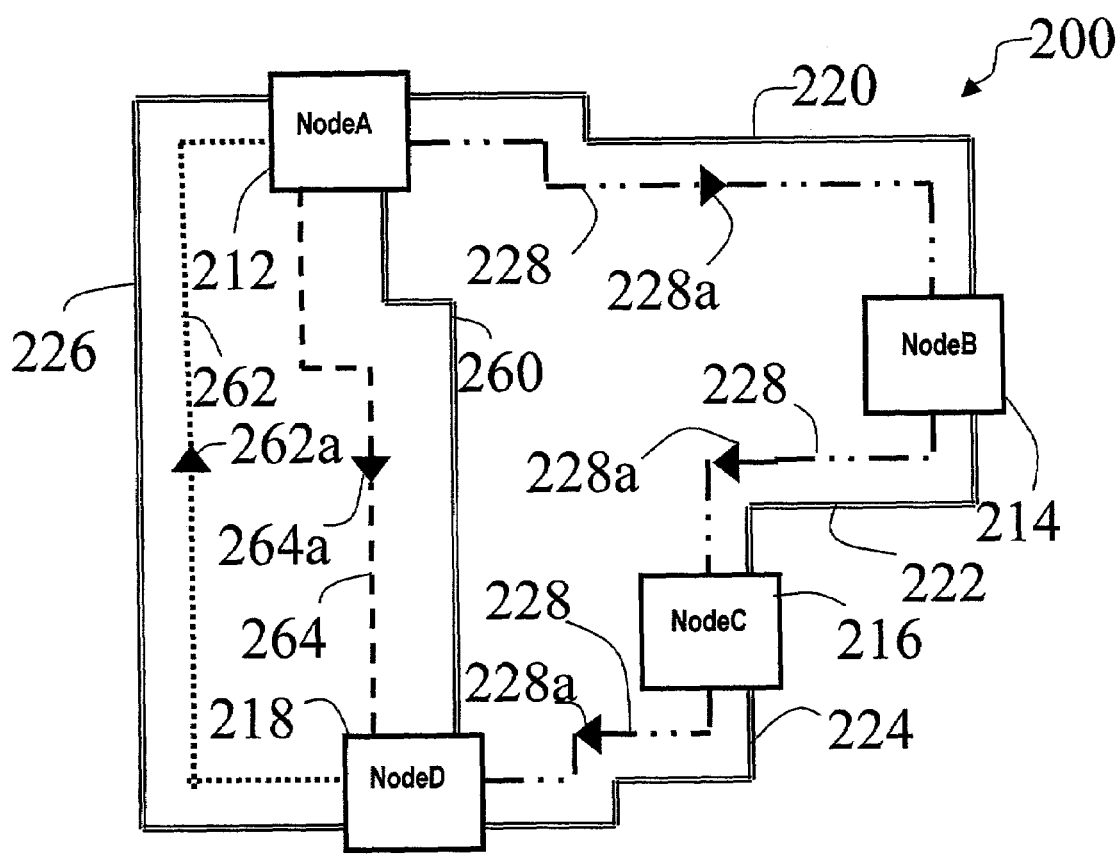
FIG. 3a is a diagram illustrating the graphical display of an optical network topology according to a third embodiment of the invention.
Figure 3B:
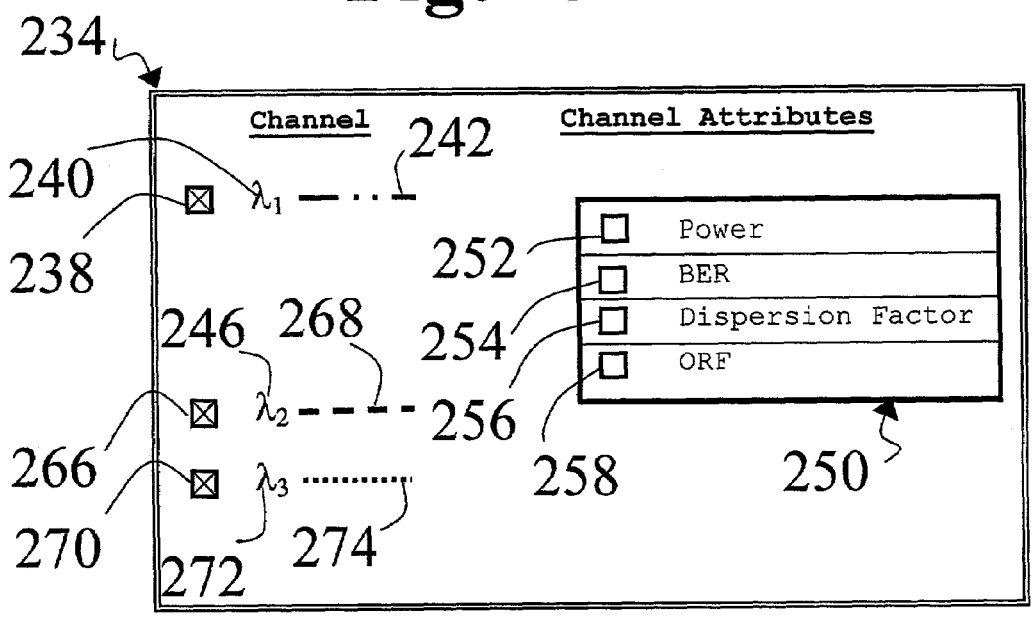

FIGS. 3a and 3b illustrate graphical display of the third embodiment of the invention. The graphical display 200 is similar to that of the second embodiment, except a plurality of channels are selected for highlighting by the operator. Similar elements in FIGS. 2a and 2b and FIGS. 3a and 3b are designated by the same reference numerals, incremented by 100 respectively. In the exemplary user interface dialog box 234, illustrated by FIG. 3b, the operator has chosen to select the highlighting of channels $\lambda_1$, $\lambda_2$ and $\lambda_3$ in the graphical display 200.

Thus, the automatic visualization of the topology of the optical network is provided, including simultaneous graphical display of paths and directions of propagation of several optical wavelength channels, thereby providing a means for more efficient monitoring of the network topology.

Figure 4A:
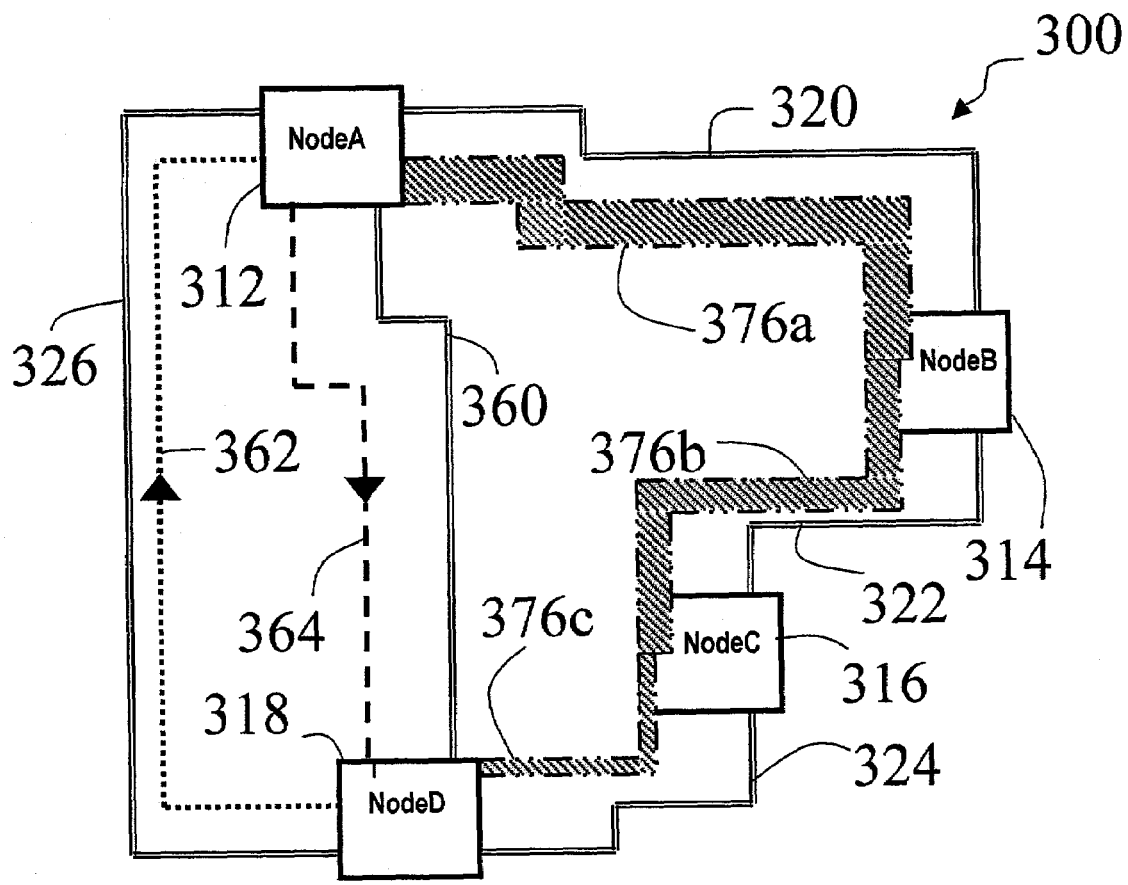
FIG. 4a is a diagram illustrating the graphical display of an optical network topology according to a fourth embodiment of the invention.
Figure 4B:
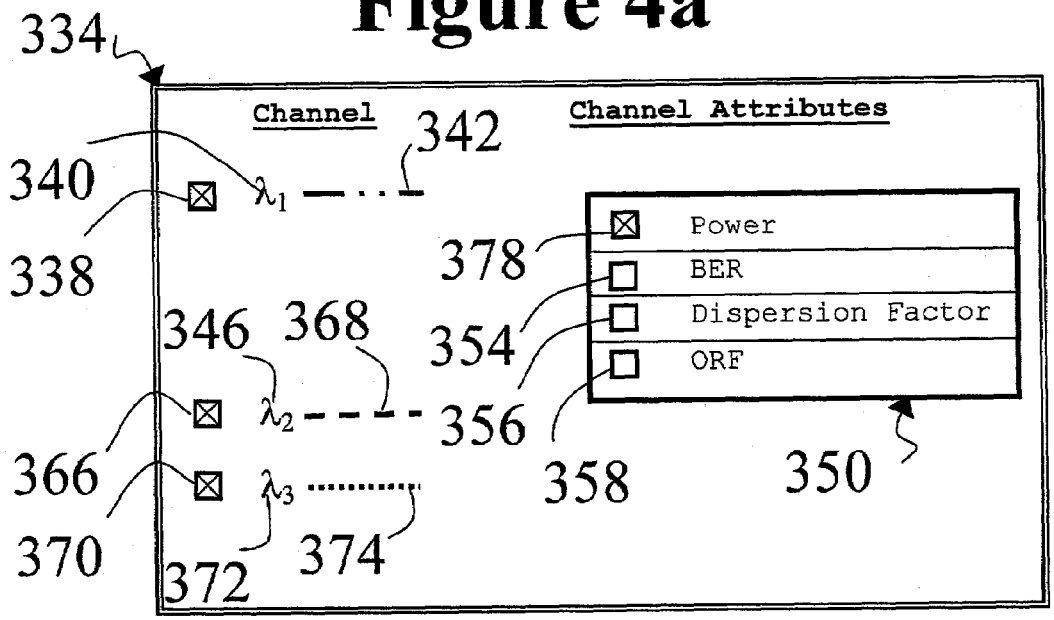

FIGS. 4a and 4b further illustrate a graphical display of an optical network topology according to the fourth embodiment of the invention. The graphical display 300 is similar to that of the third embodiment, except the channel attributes for the channel $\lambda_1$ are selected for the display by the operator. Similar elements in FIGS. 3a and 3b and FIGS. 4a and 4b are designated by the same reference numerals, incremented by 100. In the pop-up dialog box 350 for channel $\lambda_1$, the operator has chosen to highlight only the power attribute 378 for the $\lambda_1$ channel by selecting only the power attribute checkbox 378. This attribute indicates the average power level for the channel on the indicated optical fibre optic link between two network elements. The highlighting of the power in the graphical display 300 for channel $\lambda_1$ is shown by different widths of a set of rectangles 376a, 376b and 376c where the $\lambda_1$ channel is carried. The channel identification for channel $\lambda_1$ is indicated by the line pattern 342 on the edge of the rectangles 376a, 376b and 376c, as indicated by the line pattern 342 for channel $\lambda_1$ in dialog box 334 in FIG. 4b.

Thus, the automatic visualization of the optical network topology is provided, including paths, directions of propagation and attributes for the optical channels in the network.

FIG. 5 shows a table, which illustrates four exemplary attributes for a channel, namely, Power, Bit Error Rate, Dispersion Factor and Optical Return Factor. Each attribute has four 25% quartile percentage ranges, each range of each attribute using a unique graphical user interface characteristic to identify the range on the graphical display of the network. Each percentage range for each attribute has an associated meaning, i.e. the quantitative range of variation of the attribute. The power attribute indicates the average power level for a channel between two network elements, and each percentage quartile range is identified by different widths of a box for the optical fiber link between two network elements, where the lowest average power is indicated by the narrowest box, and the highest average power by the widest box. The percentage quartile range values for the Bit Error Rate (BER), Dispersion Factor and Optical Return Factor (ORF) attributes are indicated by unique monochromatic shading for each attribute, where the lowest value for an attribute is indicated by the most sparse shading, and the highest value for an attribute is indicated by the most dense shading. The meaning of each quartile range for each attribute is given, where applicable.

Figure 6A:
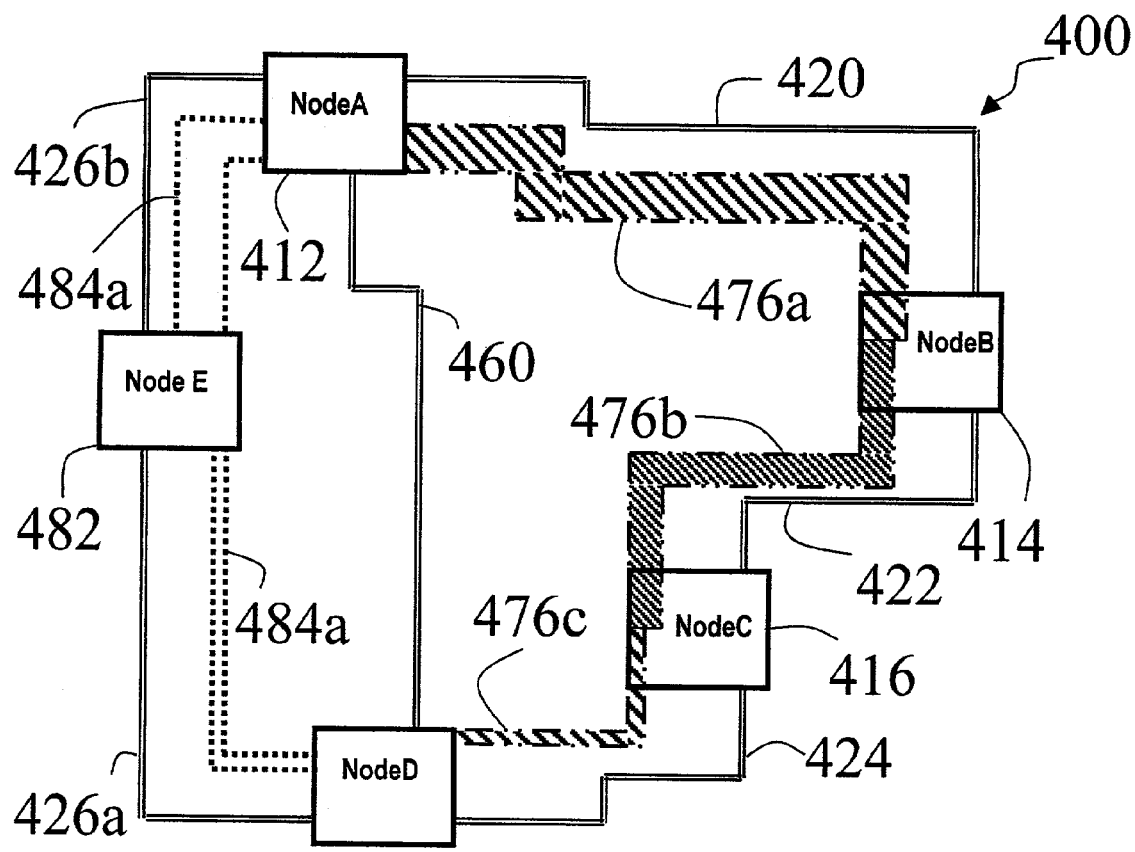
FIG. 6a is a diagram illustrating the graphical display of an optical network topology according to a fifth embodiment of the invention.
Figure 6B:
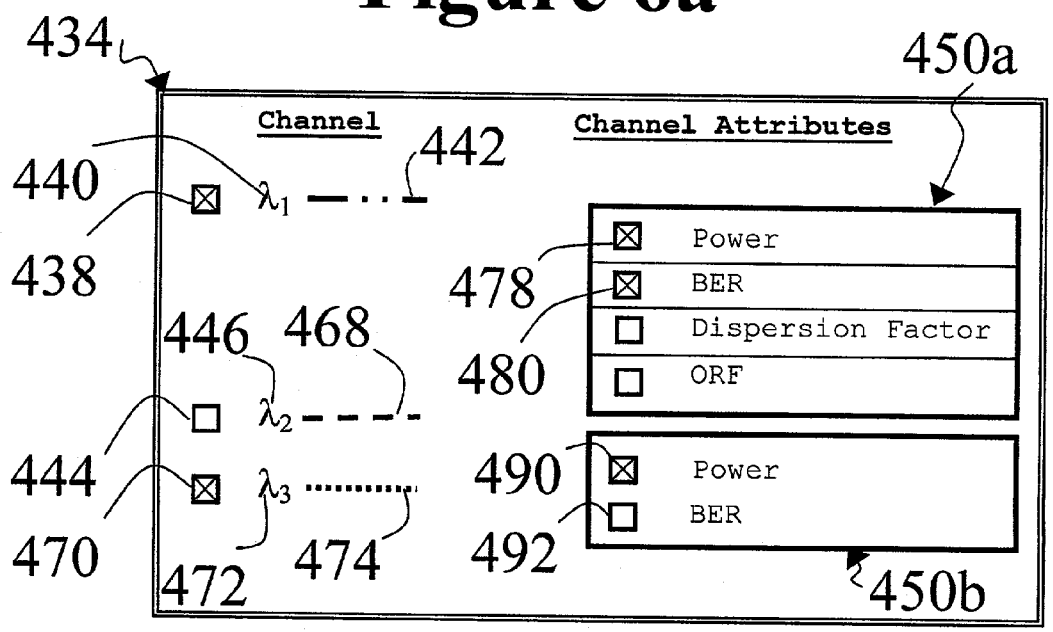

FIGS. 6a and 6b illustrate graphical display 400 of the network topology according to the fifth embodiment of the invention. The graphical display 400 is similar to that of the fourth embodiment, except two channel attributes for the channel $\lambda_1$ are selected for the display by the operator, and one channel attribute for one of the $\lambda_2$ and $\lambda_3$ channels is selected. Similar elements in FIGS. 4a and 4b and FIGS. 6a and 6b are designated by the same reference numerals, incremented by 100. In the dialog box 450a, the operator has chosen to highlight the power attribute and the BER attribute for channel $\lambda_1$ by selecting the checkboxes 478, 480 respectively. The operator has also chosen to highlight the power attribute for channel $\lambda_3$ by selecting the checkbox 490 in dialog box 450b. In FIG. 6a, the power attribute for channel $\lambda_3$ is indicated by the width of the rectangles 484a and 484b. For illustration purposes only, an additional nodeE designated by reference numeral 483 is also shown in the network.

Thus, the topology of an optical network is provided, simultaneously showing paths, directions of propagation and attributes of several channels in the network, thereby providing a more immediate and effective visualization of the topology and performance of the network.

If the paths of the channels selected for the graphical display overlap either partly or entirely, the paths and associated attributes for different channels may be displayed beside each other so that not to block each other.

Figure 6C:
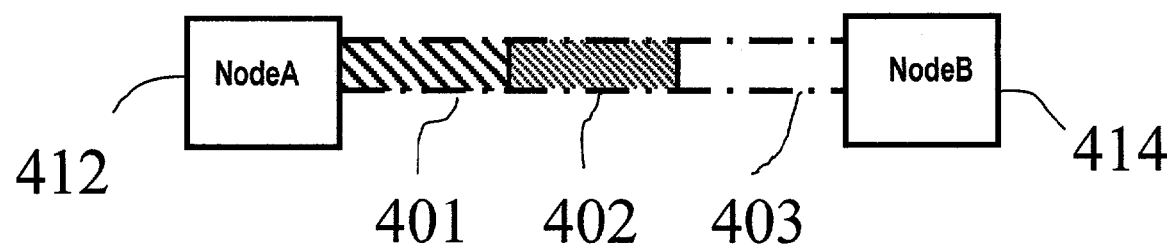
FIGS. 6c and 6d illustrate the graphical display of the network topology of FIG. 6a when several channel attributes are displayed simultaneously.
Figure 6D:
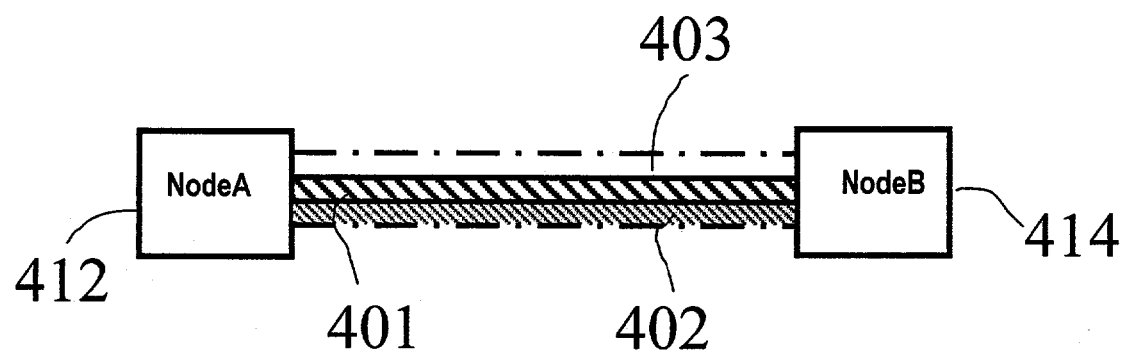

In a modification to the 5th embodiment, if more than one channel attribute has to be simultaneously displayed, the segment of channel path between the two network elements can be split into a number of sections 401, 402, 403 either vertically as shown in FIG. 6c or horizontally as shown in FIG. 6d, the number of sections being equal to the number of the attributes to be displayed. Then each attribute is graphically represented in the corresponding section of the path segment for the selected channel.

Generalizing the approach explained with regard to FIGS. 6c and 6d, the following approach may be used to display an additional number of channel attributes. The geometrical shape, representing the path of the channel in the network, may be split into segments so that each segment corresponds to the path of the channel between two nodes. Each segment may further be split into sections whose number is equal to the number of the attributes to be displayed wherein each section uses a distinct graphical display characteristic and represents the value of the corresponding attribute between the two nodes.

Figure 7A:
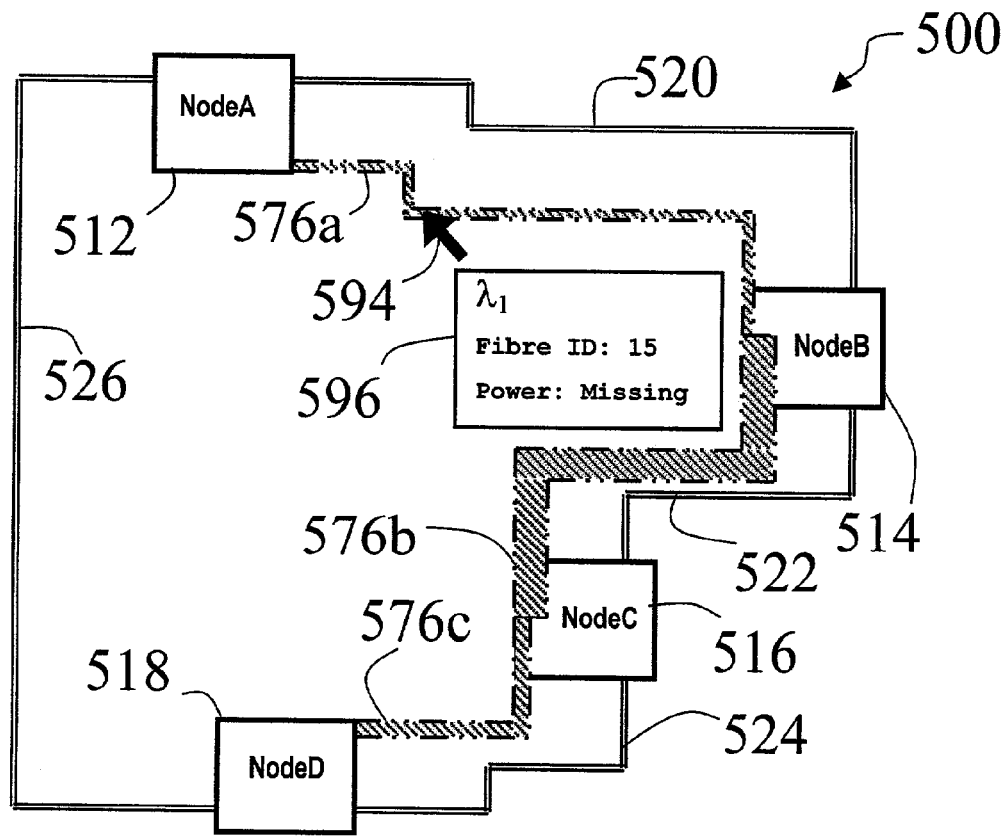
FIG. 7a is a diagram illustrating the graphical display of an optical network topology according to a sixth embodiment of the invention.
Figure 7B:
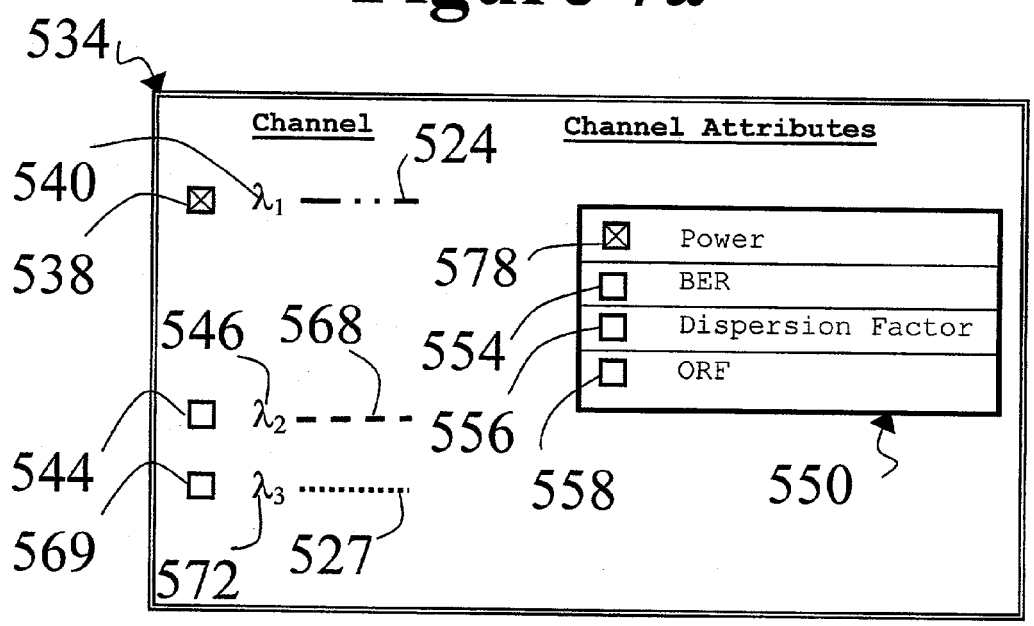

FIGS. 7a and 7b illustrate a graphical display 500 of the optical network topology according to the sixth embodiment of the invention. The graphical display 500 is similar to that of the fourth embodiment, except a text information box 596 is displayed. Similar elements in FIGS. 4a and 4b and FIGS. 7a and 7b are designated by the same reference numerals, incremented by 200 respectively. In the example shown in FIG. 7b, the operator has chosen to highlight channel λ₁ by selecting the checkbox 538 in dialog box 534. The operator has also chosen to highlight the power attribute for channel λ₁ by selecting the checkbox 578 in dialog box 550. In the graphical display 500, the operator has moved the graphics input device cursor 594 over the channel attribute display 576a for channel λ₁. As a result, a text information box 596 is displayed, containing the channel identifier, the fiber identifier and the value for the selected power attribute. This provides a means for both visualizing the topology and attributes of the network, and for monitoring the performance of an individual channel in more detail.

In a modification to the above embodiments, an audible alarm and/or visual alarm, e.g. flashing, can be produced when an error condition occurs for a channel attribute on a link between the two nodes in the network, the error condition indicating, e.g. low power, high bit error rate, low dispersion factor or low optical return factor. Thus, a means is provided for alerting the operator when an error occurs anywhere in the network, permitting more effective monitoring of the health of the network.

Various graphical display characteristics may be used for the graphical display in the embodiment of the invention, including shading, pattern, variations in geometrical shape and other techniques. While in the embodiments described above, a monochromatic graphical characteristics have been used for visualization of different channels and their attributes, it is contemplated that other graphical display characteristic tics may be also used, including color coded techniques, for unique identification of channels and associates attributes in the network.

The embodiment of the invention has the following advantages. By providing graphical visualization of the path of the channel in the network accompanied by simultaneous graphical visualization of channel attributes, it guarantees more effective monitoring of the network performance and provides easier and more reliable control of operation of the network.

Although specific embodiments of the invention have been described in detail, it will be apparent to one skilled in the art that variations and modifications to the embodiments may be made within the scope of the following claims.

What is claimed is:

1. A computer-implemented method for visualizing a topology of an optical network, comprising the steps of:
   determining a path of a channel in the network;
   determining one or more attributes of the channel characterizing the quality of signal transmission by the channel along the path of the channel in the network when the channel is present in the network; and
   graphically displaying the path of the channel in the network including displaying a direction of propagation of the channel in the network together with the evolution of said one or more attributes of the channel along the path;
   wherein the step of graphically displaying the path of the channel in the network further comprises representing the path by a geometrical shape, which is split into segments, each segment corresponding to the path of the channel between two nodes, each segment being further split into sections whose number is equal to the number of the attributes to be displayed, each section using a respective graphical display characteristic, representing the value of the corresponding attribute between the two nodes.

2. A method as described in claim 1, wherein the step of determining one or more attributes of the channel comprises determining one or more of the following attributes of the channel:
   power;
   bit error rate;
   dispersion factor; and
   optical return factor.

3. A method as described in claim 1, wherein the step of graphically displaying the path of the channel comprises graphically displaying the path of more than one channel simultaneously.

4. A method as described in claim 1, wherein the step of graphically displaying the path of the channel comprises graphically displaying more than one channel attribute simultaneously.

5. A method as described in claim 1, wherein the step of using graphical displaying characteristics comprises using one or more of the following characteristics:
   color;
   shading;
   pattern; and
   geometrical shape.

6. A method as described in claim 1, wherein the step of representing the path by the geometric shape comprises choosing the geometrical shape as being substantially a line, the thickness of the line representing the value of the channel attribute to be displayed.

7. A method as described in claim 6, wherein the step of displaying the path of the channel in the network further comprises displaying one more channel attribute by using a tilling of the thickness of the line, the filling being one of the pattern and shading, variations of the filling representing the evolution of the value of the channel attribute.

8. A method as described in claim 1, wherein the step of graphically displaying the path of the channel in the network comprises displaying the path of the channel on a computer screen.

9. A method as described in claim 8, wherein the step of determining the attribute of the channel along the path of the channel in the network comprises customized selection of the attribute from a menu.

10. A method as described in claim 3, wherein the step of simultaneously displaying the path of more than one channel in the network comprises customized selection of the channels from a menu.

11. A method as described in claim 1, wherein the step of graphically displaying the path of the channel in the network comprises refreshing the graphical displaying of the channel path in response to a signal, the refreshed graphical display incorporating changes occurred in the network since previous graphical displaying.

12. A method as described in claim 11, wherein the step of refreshing the graphical display comprises refreshing the graphical display in response to an external signal.

13. A method as described in claim 11, wherein the step of refreshing the graphical display comprises refreshing the graphical display at discrete time intervals.

14. A method as described in claim 8, wherein the step of graphically displaying the path of the channel in the network further comprises displaying the value of the channel attributes in a text information box.

15. A method as described in claim 14, wherein the step of displaying the value of channel attributes in the text information box comprises displaying the text information box in response to the movement of a screen pointing device over the path of the channel in the network, the text information box showing the value of the channel attributes at the position along the path of the channel in the network, indicated by the pointing device.

16. A method as described in claim 1, wherein the step of displaying the path of the channel in the network further comprises the step of generating one of the audible and visual alarm if an error condition along the path of the channel occurs.

17. A computer program product for visualizing topology of an optical network, comprising:
   computer usable medium having computer readable program code means embodied in said medium for causing a computer to visualize the topology of the network, said computer program product having:
   computer readable program code means for causing said computer to determine a path of a channel in the network;
   computer readable program code means for causing said computer to determining one or more attributes of the channel characterizing the quality of signal transmission by the channel along the path of the channel in the network when the channel is present in the network; and
   computer readable program code means for causing said computer to graphically display the path of the channel in the network including displaying a direction of propagation of the channel in the network together with the evolution of said one or more attributes of the channel along the path;
   wherein the step of graphically displaying the path of the channel in the network further comprises representing the path by a geometrical shape, which is split into segments, each segment corresponding to the path of the channel between two nodes, each segment being further split into sections whose number is equal to the number of the attributes to be displayed, each section using a respective graphical display characteristic, representing the value of the corresponding attribute between the two nodes.

18. An article of manufacture comprising a computer program, stored in a computer readable medium, for visualization of topology of an optical network, comprising:
   computer readable program code means for causing a computer to determine a path of a channel in the;
   computer readable program code means for causing said computer to determining one or more attributes of a channel characterizing the quality of signal transmission by the channel along the path of the channel in the network when the channel is present in the network; and
   computer readable program code means for causing said computer to graphically display the path of the channel in the network including displaying a direction of propagation of the channel in the network together with the evolution of said one or more attributes of the channel along the path;
   wherein the step of graphically displaying the path of the channel in the network further comprises representing the path by a geometrical shape, which is split into segments, each segment corresponding to the path of the channel between two nodes, each segment being further split into sections whose number is equal to the number of the attributes to be displayed, each section using a respective graphical display characteristic, representing the value of the corresponding attribute between the two nodes.

19. A computer system for visualizing topology of an optical network, comprising:
   a computer having a computer readable medium having computer readable program code means embodied in said medium for causing a computer to visualize the topology of the network, said computer readable program code means including:
   computer readable program code means for causing said computer to determine a path of the channel in the network;
   computer readable program code means for causing said computer to determining one or more attributes of the channel characterizing the quality of signal transmission by the channel along the path of the channel in the network when the channel is present in the network; and
   computer readable program code means for causing said computer to graphically display the path of the channel in the network including displaying a direction of propagation of the channel in the network together with the evolution of said one or more attributes of the channel along the path;
   wherein the step of graphically displaying the path of the channel in the network further comprises representing the path by a geometrical shape, which is split into segments, each segment corresponding to the path of the channel between two nodes, each segment being further split into sections whose number is equal to the number of the attributes to be displayed, each section using a respective graphical display characteristic, representing the value of the corresponding attribute between the two nodes.

* * * * *

UNITED STATES PATENT AND TRADEMARK OFFICE
CERTIFICATE OF CORRECTION

PATENT NO. : 7,047,496 B2  Page 1 of 1
APPLICATION NO. : 10/101155
DATED : May 16, 2006
INVENTOR(S) : D.E. Nelles et al.

It is certified that error appears in the above-identified patent and that said Letters Patent is hereby corrected as shown below:

Column 8, line 32, delete "tilling" and insert --filling--.

Column 9, line 44, after the phrase "a channel in the" insert --network--.

Signed and Sealed this

Fifth Day of August, 2008

JON W. DUDAS
*Director of the United States Patent and Trademark Office*